(12) United States Patent
Warke et al.

(10) Patent No.: US 8,958,504 B2
(45) Date of Patent: Feb. 17, 2015

(54) CARRIER RECOVERY IN AMPLITUDE AND PHASE MODULATED SYSTEMS

(75) Inventors: Nirmal C. Warke, Irving, TX (US); Robert F. Payne, Lucas, TX (US); Gerd Schuppener, Allen, TX (US); Brad Kramer, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 151 days.

(21) Appl. No.: 13/607,245

(22) Filed: Sep. 7, 2012

(65) Prior Publication Data

US 2014/0072024 A1    Mar. 13, 2014

(51) Int. Cl.
*H03D 3/18*      (2006.01)
*H03D 3/24*      (2006.01)

(52) U.S. Cl.
USPC ........... 375/327; 375/235; 375/294; 375/344; 375/349; 375/350

(58) Field of Classification Search
USPC .......... 375/229–236, 286, 293–294, 316–376
See application file for complete search history.

(56) References Cited

U.S. PATENT DOCUMENTS

| | | | |
|---|---|---|---|
| 6,778,589 B1 * | 8/2004 | Ishii | 375/136 |
| 7,079,574 B2 | 7/2006 | Rafie et al. | |
| 7,266,162 B2 * | 9/2007 | Jiang | 375/326 |
| 7,535,976 B2 * | 5/2009 | Jaffee et al. | 375/327 |
| 7,738,599 B2 * | 6/2010 | Bock et al. | 375/322 |
| 7,912,138 B2 * | 3/2011 | Geile et al. | 375/260 |
| 7,977,991 B2 * | 7/2011 | Iwakuni | 327/205 |
| 8,081,948 B2 | 12/2011 | Pinel et al. | |
| 8,586,461 B2 * | 11/2013 | Stevenson | 438/571 |
| 8,605,775 B2 * | 12/2013 | Massey | 375/224 |
| 8,644,427 B2 * | 2/2014 | Porret et al. | 375/340 |
| 8,644,786 B2 * | 2/2014 | Mirzaei et al. | 455/318 |
| 2003/0224725 A1 * | 12/2003 | Limberg | 455/23 |
| 2006/0018408 A1 * | 1/2006 | Bock et al. | 375/322 |
| 2006/0019627 A1 * | 1/2006 | Talbot | 455/296 |
| 2006/0023813 A1 * | 2/2006 | Jaffe et al. | 375/327 |
| 2010/0093299 A1 | 4/2010 | Pinel et al. | |
| 2011/0075713 A1 | 3/2011 | Lovberg et al. | |
| 2011/0122932 A1 | 5/2011 | Lovberg et al. | |
| 2012/0033965 A1 | 2/2012 | Zhang et al. | |
| 2013/0315346 A1 * | 11/2013 | Varma et al. | 375/316 |
| 2013/0335632 A1 * | 12/2013 | Silver et al. | 348/571 |

FOREIGN PATENT DOCUMENTS

WO    WO2012074551    6/2012

* cited by examiner

*Primary Examiner* — Sam K Ahn
*Assistant Examiner* — James M Perez
(74) *Attorney, Agent, or Firm* — John R. Pessetto; Frederick J. Telecky, Jr.

(57) ABSTRACT

A method is provided. A multi-amplitude signal is received and downconverted so as to generate I and Q signals using a local oscillator signal. The I and Q signals are equalized, and the equalized I and Q signals are digitized. First and second gains are adjusted with the second and first digital signals, respectively, and applied to the equalized I and Q signals, respectively. The difference between the first and second amplified signals is determined, and an error signal is generated from the difference between the first and second amplified signals. The local oscillator signal is then adjusted with the error signal.

19 Claims, 3 Drawing Sheets

US 8,958,504 B2

CARRIER RECOVERY IN AMPLITUDE AND PHASE MODULATED SYSTEMS

TECHNICAL FIELD

The invention relates generally to a communications system and, more particularly, to an amplitude and phase modulated communication system.

BACKGROUND

In most high performance communication systems (e.g., digital cell phone systems), carrier recovery is performed in the digital domain because the computing power is readily available. However, in other communications systems (e.g., optical or millimeter wave communications systems) performing carrier recovery in the digital domain may not be feasible because (for example) of the cost of an analog-to-digital converter (ADC) with requisite performance characteristics. As a result, these communications systems have resorted to using constant amplitude modulated communications (e.g., quadrature phase-shift keying or QPSK) along with Costas carrier recovery techniques, but it would be desirable to use more complex amplitude and phase modulated schemes (e.g., m-quadrature amplitude modulation or m-QAM) so as to increase channel throughput. Therefore, there is a need for an analog-domain carrier recovery technique for amplitude and phase modulated communications schemes.

Some examples of conventional systems are: U.S. Pat. Nos. 7,079,574; 8,081,948; U.S. Patent Pre-Grant Publ. No. 2010/0093299; U.S. Patent Pre-Grant Publ. No. 2011/0075713; U.S. Patent Pre-Grant Publ. No. 2011/0122932; U.S. Patent Pre-Grant Publ. No. 2012/0033965; PCT Publ. No. WO2012074551.

SUMMARY

In accordance with the present invention, an apparatus is provided. The apparatus comprises a receiver having: an input circuit; a mixer that is coupled to the input circuit; a voltage controlled oscillator (VCO) that is coupled to the mixer; a baseband circuit having: a first equalizer that is coupled to the mixer; a first analog-to-digital converter (ADC) that is coupled to the first equalizer; a second equalizer that is coupled to the mixer; a second ADC that is coupled to the second equalizer; a Costas loop having: a first amplifier that is coupled to the first equalizer and having a first gain that is controlled by the second ADC; a second amplifier that is coupled to the first equalizer and having a second gain that is controlled by the first ADC; an adder that is coupled to the first and second amplifiers so as to determine the difference between the outputs of the first and second amplifiers; and a feedback circuit that is coupled between the adder and the VCO.

In accordance with the present invention, the first equalizer further comprises: a continuous-time linear equalizer (CTLE) that is coupled to the mixer; a sample-and-hold (S/H) circuit that is coupled to the CTLE; and a filter that is coupled to the S/H circuit.

In accordance with the present invention, wherein the S/H circuit further comprises a first S/H circuit, and wherein the filter further comprises first filter, and wherein the CTLE further comprises a first CTLE, and wherein the second equalizer further comprises: a second CTLE that is coupled to the mixer; a second S/H circuit that is coupled to the second CTLE; and a second filter that is coupled to the second S/H circuit.

In accordance with the present invention, the baseband circuit further comprises: a clocking circuit that is coupled to the first and second S/H circuits; a clock-data recovery circuit that is coupled to the clocking circuit, the first filter, and the second filter.

In accordance with the present invention, the mixer further comprises an in-phase/quadrature (IQ) mixer.

In accordance with the present invention, the feedback circuit further comprises a low pass filter (LPF) that is coupled between the adder and the VCO.

In accordance with the present invention, the feedback circuit further comprises: a third S/H circuit that is coupled to the adder; a third amplifier that is coupled to the third S/H circuit and the LPF; and a signal generator that is coupled between the LPF and the VCO.

In accordance with the present invention, an apparatus is provided. The apparatus comprises: a first baseband circuit; a transmitter that is coupled to the first baseband circuit; a receiver that is configured to receive communications from the transmitter, wherein the receiver includes: an input circuit; a mixer that is coupled to the input circuit; a VCO that is coupled to the mixer; a baseband circuit having: a first equalizer that is coupled to the mixer; a first ADC that is coupled to the first equalizer; a second equalizer that is coupled to the mixer; a second ADC that is coupled to the second equalizer; a Costas loop having: a first amplifier that is coupled to the first equalizer and having a first gain that is controlled by the second ADC; a second amplifier that is coupled to the first equalizer and having a second gain that is controlled by the first ADC; an adder that is coupled to the first and second amplifiers so as to determine the difference between the outputs of the first and second amplifiers; and a feedback circuit that is coupled between the adder and the VCO.

In accordance with the present invention, a method is provided. The method comprises receiving a multi-amplitude signal; downconverting the multi-amplitude signal so as to generate I and Q signals using a local oscillator signal; equalizing the I and Q signals so as to generate equalized I and Q signals; digitizing the equalized I and Q signals so as to respectively generate first and second digital signals; adjusting first and second gains with the second and first digital signals, respectively; applying the first and second gains to the equalized I and Q signals, respectively, so as to generate first and second amplified signals; determining the difference between the first and second amplified signals; generating an error signal from the difference between the first and second amplified signals; and adjusting the local oscillator signal with the error signal.

In accordance with the present invention, the step of equalizing further comprises filtering the I and Q signals.

In accordance with the present invention, the method further comprises performing clock-data recovery from the equalized I and Q signals.

In accordance with the present invention, the step of generating the error signal further comprises filtering the difference between the first and second amplified signals to generate the error signal.

In accordance with the present invention, the step of generating the error signal further comprises: sampling-and-holding the difference between the first and second amplified signal so as to generate a sampled signal; amplifying the sampled signal to generate an amplified, sampled signal; filtering the amplified, sampled signal; and generating the error signal after the step of filtering.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
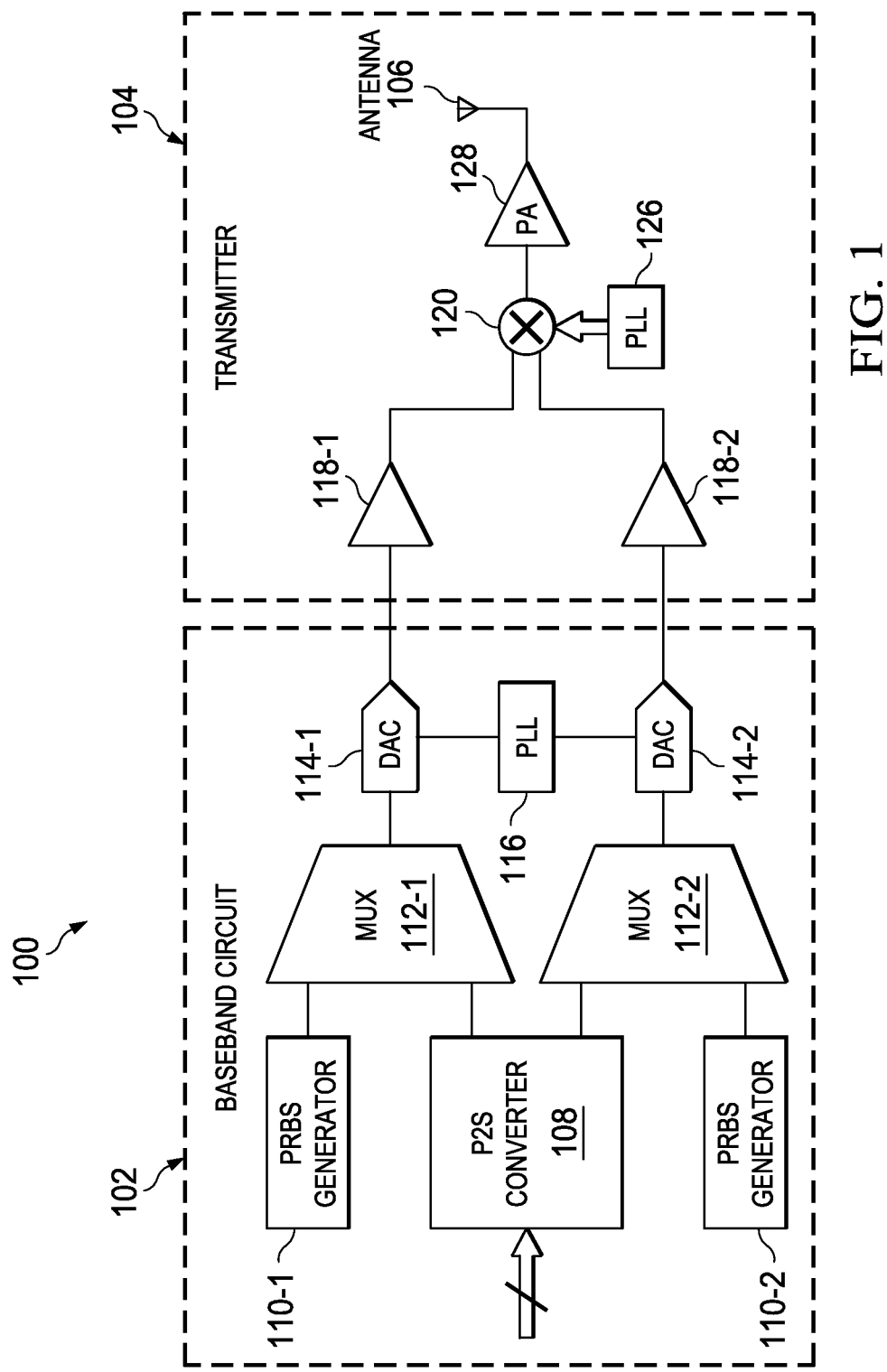
FIGS. 1 and 2 are diagrams of an example of input/output (IO) system in accordance with the present invention.

Refer now to the drawings wherein depicted elements are, for the sake of clarity, not necessarily shown to scale and wherein like or similar elements are designated by the same reference numeral through the several views.

Figure 2:
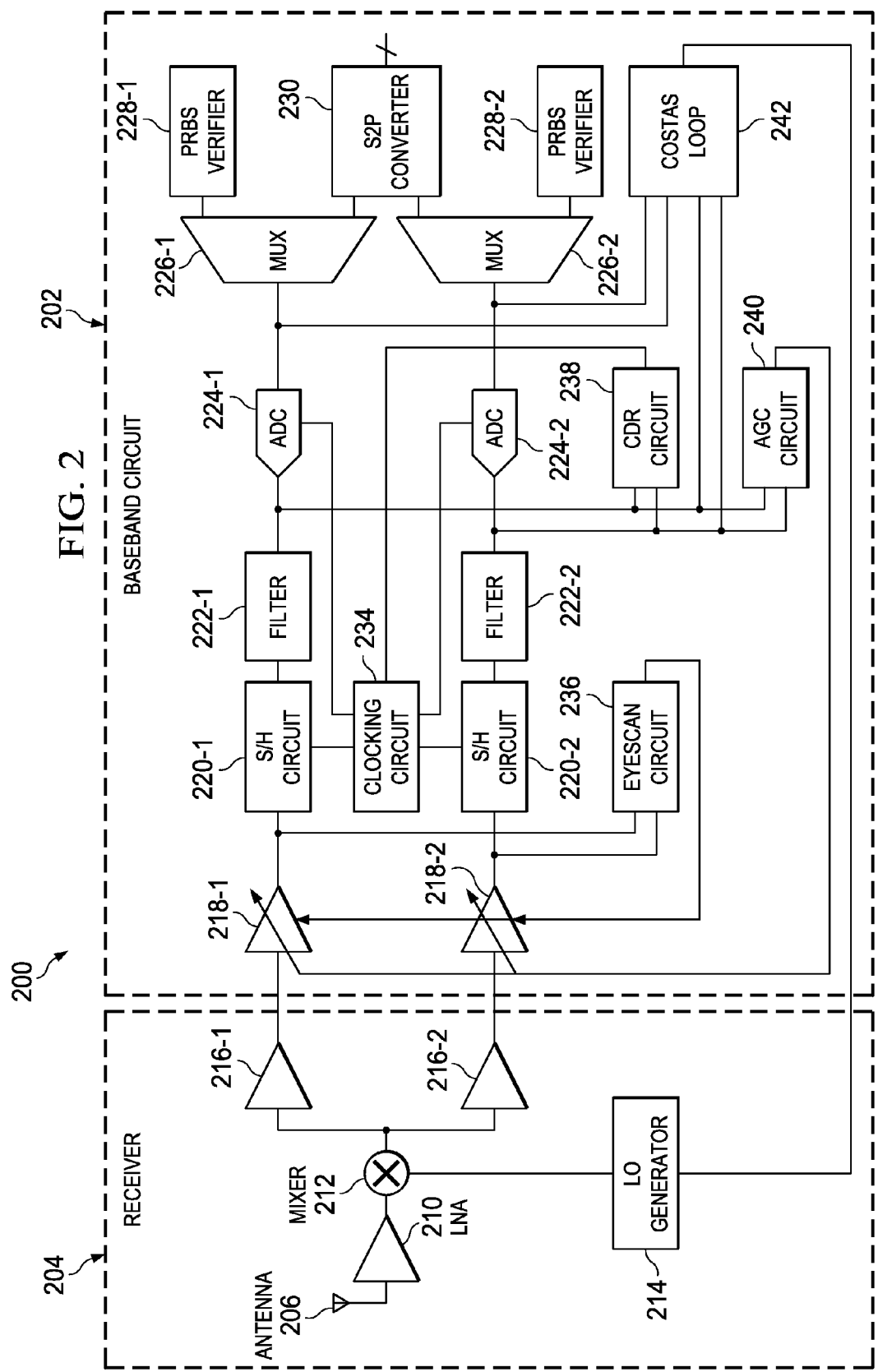

Turning to FIGS. 1 and 2 of the drawings, an example of an IO system in accordance with the present invention can be seen. In this example, there is a transmitter portion 100 and a receiver portion 200 that are able to communicate with one another. Specifically, this example IO system allows for communication between the transmitter portion 100 and receiver portion 200 through millimeter waves (i.e., wavelengths between about 0.1 mm and 10 mm). Alternatively, optical communication (e.g. through an optical fiber) may be employed. As another alternative, to allow two-way communications, the transmitter portion 100 and receiver portion 200 can be integrated together on each side within one or more integrated circuits (ICs) to form transceivers.

In operation, the baseband circuit 102 is able to generate in-phase (I) and quadrature (Q) signals so as to allow the transmitter 104 to transmit signals using, for example, an m-QAM scheme. A digital data signal is provided to the parallel-to-serial (P2S) converter so as to be serialized. The serialized output from the P2S converter is converted to an analog signal by digital-to-analog converters (DACs) 114-1 and 114-2 (which are clocked by the phase lock loop or PLL 116). For example, the digital data can be provided over an 8-bit bits at 10 Gbps (having a total of 80 Gbps), and, for example, the PLL 116 can generate about a 5 GHz signal from about a 100 MHz reference clock signal. The output from the DACs 114-1 and 114-2 (which can, for example, operate as I and Q channel DACs) can, for example, generate a two-bit 4-pulse amplitude modulation or 4-PAM signals. Amplifiers 118-1 and 118-2 operate to amplify, for example, the baseband I and Q signals from DACs 114-1 and 114-2. The outputs from amplifiers 118-1 and 118-2 can be mixed with a local oscillator signal using mixer 120 (i.e., performing an upconversion). This local oscillator signal (which, for example, can be about 160 GHz) can be generated from PLL 126. Power amplifier (PA) 128 can then amplify the mixer 120 output that can be transmitted through antenna 106. The receiver 204 is then able to receive these radio frequency (RF) signals through antenna 206. A low noise amplifier (LNA) 210 is able to amplify the RF signal, and the mixer 212 and local oscillator (LO) generator 214 (which can, for example, be voltage controlled oscillator or VCO that can, for example, operate at about 160 GHz) can downconvert this RF signal so as to generate I and Q channel signals for amplifiers 216-1 and 216-2.

Once the I and Q signals have been generated by receiver 204, baseband circuit 202 is able to recover both the clock and data. Typically, the I and Q signals are equalized and digitized (e.g., with ADCs 224-1 and 224-2) so as to produce parallel data for a bus with the serial-to-parallel (S2P) converter 230. The equalization is generally performed by the continuous-time linear equalizers (CTLEs) 218-1, sample-and-hold (S/H) circuits 220-1 and 220-2, and filters 222-1 and 222-2 (which can, for example, be finite impulse response or FIR filters). Typically, the eyescan circuit 236 (which can be comprised of two one-bit ADCs operating with about a 5 GHz clock) monitors the outputs of CTLEs 218-1 and 218-2 so as to provide adjustments top the CTLEs 218-1 and 218-2 and filters 222-1 and 222-2 to maintain a proper or desired eye-opening. The automatic gain control (AGC) circuit 240 (which can, for example be comprised of two one-bit ADCs operating with about a 5 GHz clock) can monitor the output from filters 222-1 and 222-2 to provide automatic gain control for CTLEs 218-1 and 218-2. The clocking circuit 324 (which can be comprised of a PLL that can receive about a 100 MHz reference signal and a delay locked loop or DLL that can provide 48 phases of about a 5 GHz clock) is able to provide clock signals to the S/H circuits 220-1 and 220-2, ADCs 224-1, 224-2, eyescan circuit 236, CDR circuit 238, and AGC circuit 240.

Of interest here, however, is the Costas loop 242. By using a Costas loop 242, an initialization process can be employed that allows for carrier tracking without having the overhead of periodic transmission of a training sequence and without having the corresponding frame synchronization logic. During this initialization, a binary phase-shift keying (BPSK) modulated carrier with alternating 1's and 0's can be transmitted through the use of pseudorandom binary sequence (PRBS) generators 110-1 and 110-2 that are selected to transmit with multiplexers 112-1 and 112-2, and PRBS verifiers 228-1 and 228-2 (which can be selected by way of multiplexers 226-1 and 226-2) can be used to assist in achieving a reference clock lock in phase and frequency. With the phase and frequency lock to the reference clock, the Costas loop 242 can be used to achieve carrier frequency offset (CFO) lock (which can, for example, be used with a 16-QAM constellation).

Figure 3:
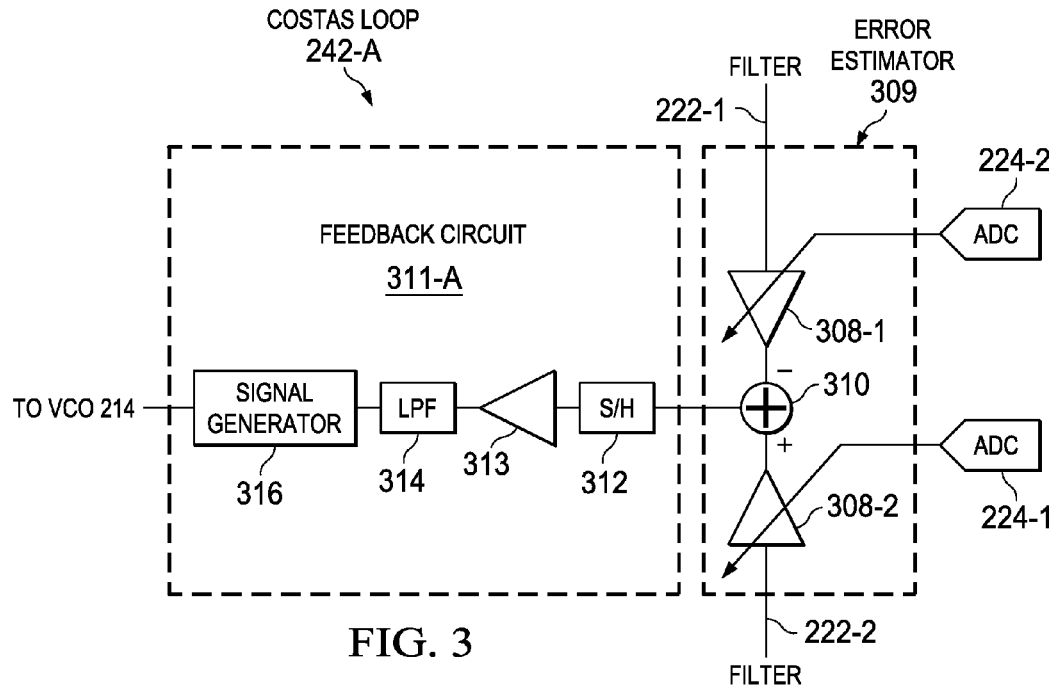
FIGS. 3 and 4 are diagrams of examples of the of the Costas loop of FIG. 2.

With the Costas loop 242 shown in FIG. 3 (which is labeled 242-A), correlations between the I and Q paths can be used to achieve the CFO lock. An error estimator 309 (which is generally comprised of amplifiers 308-1 and 308-2 and adder 310) is used to determine a difference between these paths. Specifically and for example, amplifiers 308-1 and 308-2 (which can, for example, function as limiting amplifiers) receive outputs from the respective equalizers (i.e., filters 222-1 and 222-2) with the "gains" being respectively controlled by ADCs 224-2 and 224-1. The outputs of amplifiers 308-1 and 308-1 are then applied to adder 310. The output of the adder 310 can also be gated so as to ignore the resultant error signal when the decoded symbol is not on the corner of a square constellation. The difference provided by the error estimator 309 is then modified by the feedback circuit 311-A to generate an error signal for LO generator 214. Specifically and for example, the S/H circuit (which can, for example operate at one-half of the band rate of the filters 222-1 and 222-2 when the filters 222-1 and 222-2 are two-times oversampled finite impulse responses or FIR filters) samples the difference signal provided by the error estimator 309, and this sample is amplified with amplifier 313 and filtered by low pass filter (LPF) 314 (which can, for example, be on the order of a few megahertz). The filtered signal is then used by signal generator 316 (which can, for example, be comprised of a 40 GHz VCO and a portion 160 GHz PLL) to generate the error signal for LO generator 214. This error signal that is provided to the LO generator 214 can also be scaled based on the magnitude of the received symbol.

Figure 4:
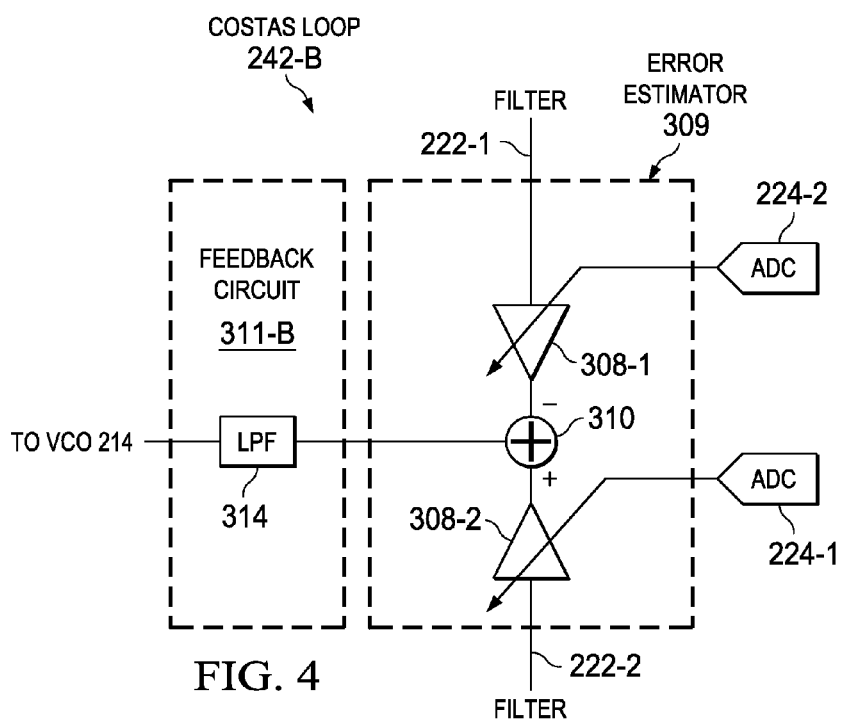

In order to simplify the circuit, a simplified feedback circuit 311-B as shown with Costas loop 242-B in FIG. 4 can also be used. As shown, the difference from error estimator 309 can be provided directly to LPF 314, and this LPF 314 can be used to directly generate the error signal for LO generator 214.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a receiver comprising:
      an input circuit;
      a mixer that is coupled to an output of the input circuit; and
      a voltage controlled oscillator (VCO) that is coupled to an input of the mixer;
   a baseband circuit comprising:
      a first equalizer that is coupled to an output of the mixer;
      a first analog-to-digital converter (ADC) that is coupled to an output of the first equalizer;
      a second equalizer that is coupled to the output of the mixer;
      a second ADC that is coupled to an output of the second equalizer; and
      a Costas loop comprising:
         a first amplifier that is coupled to the output of the first equalizer and having a first gain that is controlled by the second ADC;
         a second amplifier that is coupled to the output of the first equalizer and having a second gain that is controlled by the first ADC;
         an adder that is coupled to the first and second amplifiers so as to determine the difference between the outputs of the first and second amplifiers; and
         a feedback circuit that is coupled between the adder and the VCO.

2. The apparatus of claim 1, wherein the first equalizer further comprises:
   a continuous-time linear equalizer (CTLE) that is coupled to the mixer;
   a sample-and-hold (S/H) circuit that is coupled to the CTLE; and
   a filter that is coupled to the S/H circuit.

3. The apparatus of claim 2, wherein the S/H circuit further comprises a first S/H circuit, and wherein the filter further comprises first filter, and wherein the CTLE further comprises a first CTLE, and wherein the second equalizer further comprise:
   a second CTLE that is coupled to the mixer;
   a second S/H circuit that is coupled to the second CTLE; and
   a second filter that is coupled to the second S/H circuit.

4. The apparatus of claim 3, wherein the baseband circuit further comprises:
   a clocking circuit that is coupled to the first and second S/H circuits; and
   a clock-data recovery circuit that is coupled to the clocking circuit, the first filter, and the second filter.

5. The apparatus of claim 4, wherein the mixer further comprises an in-phase/quadrature (IQ) mixer.

6. The apparatus of claim 5, wherein the feedback circuit further comprises a low pass filter (LPF) that is coupled between the adder and the VCO.

7. The apparatus of claim 3, wherein the feedback circuit further comprises:
   a third S/H circuit that is coupled to the adder;
   a third amplifier that is coupled to the third S/H circuit and a low pass filter (LPF); and
   a signal generator that is coupled between the LPF and the VCO.

8. A communication system comprising:
   a transmitter portion comprising:
      a first baseband circuit;
      a transmitter that is coupled to the first baseband circuit;
   a receiver portion comprising:
      a receiver that is configured to receive communications from the transmitter, wherein the receiver comprises:
         an input circuit;
         a mixer that is coupled to an output of the input circuit; and
         a voltage controlled oscillator (VCO) that is coupled to an input of the mixer;
      a second baseband circuit comprising:
         a first equalizer that is coupled to an output of the mixer;
         a first analog-to-digital converter (ADC) that is coupled to an output of the first equalizer;
         a second equalizer that is coupled to the output of the mixer;
         a second ADC that is coupled to an output of the second equalizer; and
         a Costas loop comprising:
            a first amplifier that is coupled to the output of the first equalizer and having a first gain that is controlled by the second ADC;
            a second amplifier that is coupled to the output of the first equalizer and having a second gain that is controlled by the first ADC;
            an adder that is coupled to the first and second amplifiers so as to determine the difference between the outputs of the first and second amplifiers; and
            a feedback circuit that is coupled between the adder and the VCO.

9. The system of claim 8, wherein the first equalizer further comprises:
   a continuous-time linear equalizer (CTLE) that is coupled to the mixer;
   a sample-and hold (S/H) circuit that is coupled to the CTLE; and
   a filter that is coupled to the S/H circuit.

10. The system of claim 9, wherein the S/H circuit further comprises a first S/H circuit, and wherein the filter further comprises first filter, and wherein the CTLE further comprises a first CTLE, and wherein the second equalizer further comprises:
    a second CTLE that is coupled to the mixer;
    a second S/H circuit that is coupled to the second CTLE; and
    a second filter that is coupled to the second S/H circuit.

11. The system of claim 10, wherein the baseband circuit further comprises:
    a clocking circuit that is coupled to the first and second S/H circuits; and
    a clock-data recovery circuit that is coupled to the clocking circuit, the first filter, and the second filter.

12. The system of claim 11, wherein the mixer further comprises an in-phase /quadrature (IQ) mixer.

13. The system of claim 12, wherein the feedback circuit further comprises a low pass filter (LPF) that is coupled between the adder and the VCO.

14. The system of claim 13, wherein the feedback circuit further comprises:
- a third S/H circuit that is coupled to the adder;
- a third amplifier that is coupled to the third S/H circuit and the LPF; and
- a signal generator that is coupled between the LPF and the VCO.

15. A method comprising:
- receiving a multi-amplitude signal;
- downconverting the multi-amplitude signal so as to generate In-phase (I) and Quadrature (Q) signals using a local oscillator signal;
- equalizing the I and Q signals so as to generate equalized I and Q signals;
- digitizing the equalized I and Q signals so as to respectively generate first and second digital signals;
- controlling first and second gains with the second and first digital signals, respectively;
- applying the first and second gains to the equalized I and Q signals, respectively, so as to generate first and second amplified signals;
- determining the difference between the first and second amplified signals;
- generating an error signal from the difference between the first and second amplified signals; and
- controlling the local oscillator signal with the error signal.

16. The method of claim 15, wherein the step of equalizing further comprises filtering the I and Q signals.

17. The method of claim 16, wherein the method further comprises performing clock-data recovery from the equalized I and Q signals.

18. The method of claim 17, wherein the step of generating the error signal further comprises filtering the difference between the first and second amplified signals to generate the error signal.

19. The method of claim 17, wherein the step of generating the error signal further comprises:
- sampling-and-holding the difference between the first and second amplified signal so as to generate a sampled signal;
- amplifying the sampled signal to generate an amplified, sampled signal;
- filtering the amplified, sampled signal; and
- generating the error signal after the step of filtering.

* * * * *